Oct. 28, 1947.   S. B. HASELTINE   2,429,684
LOCKING MEANS FOR RAILWAY CAR HAND BRAKES
Filed Feb. 16, 1946
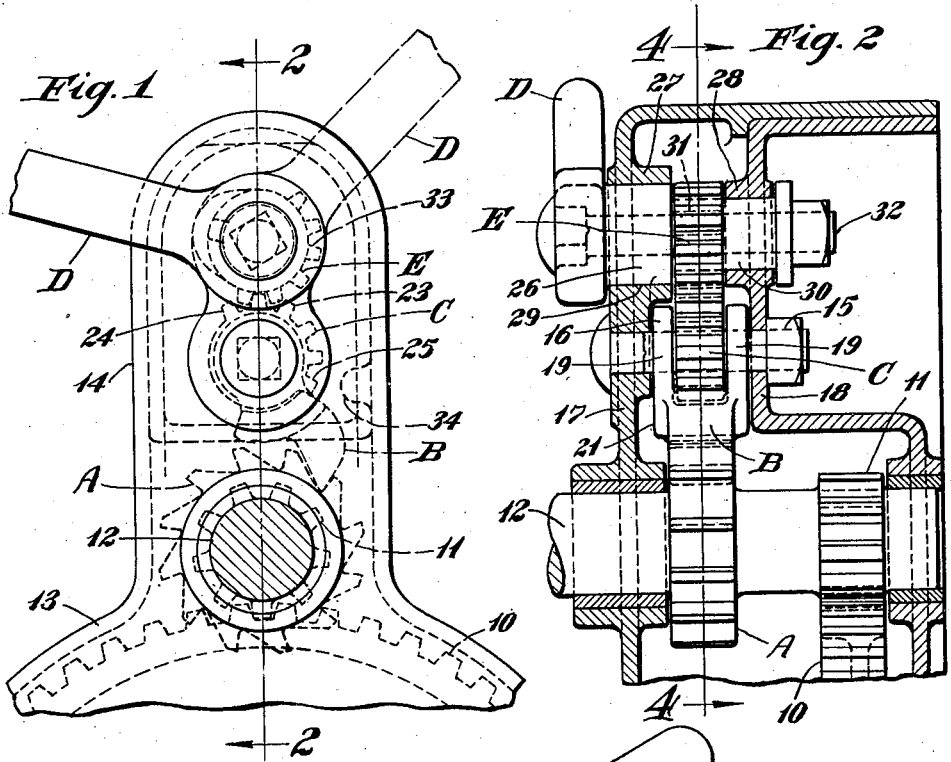
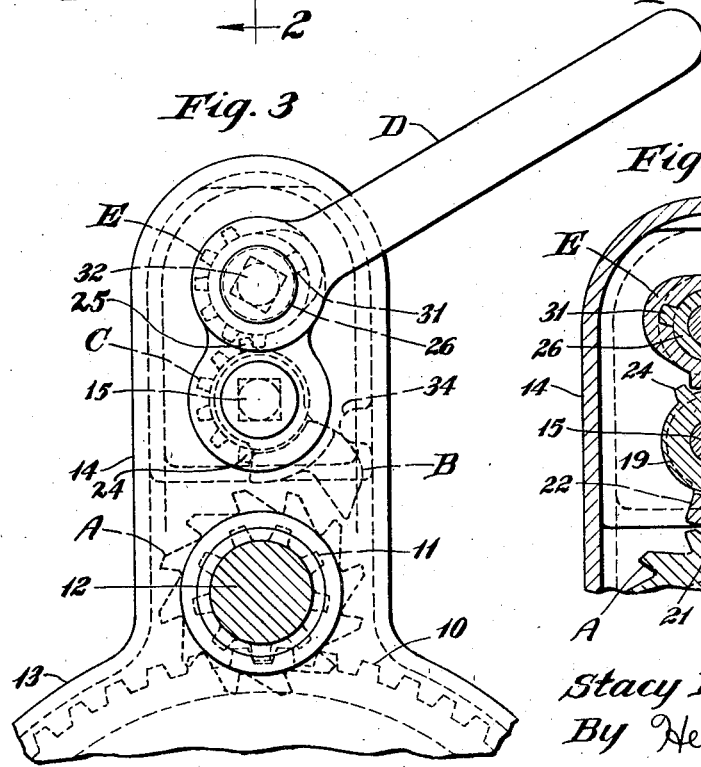
Inventor
Stacy B. Haseltine
By Henry Fuchs
Atty.

Patented Oct. 28, 1947

2,429,684

UNITED STATES PATENT OFFICE 2,429,684

LOCKING MEANS FOR RAILWAY CAR HAND BRAKES

Stacy B. Haseltine, La Grange, Ill., assignor to W. H. Miner, Inc., Chicago, Ill., a corporation of Delaware Application February 16, 1946, Serial No. 648,168

5 Claims. (Cl. 188—81.1)

This invention relates to improvements in hand brakes for railway cars, and more particularly such brakes of the power multiplying, gear driven type.

One object of the invention is to provide in a hand brake mechanism of the character indicated simple and efficient means for locking the brake in applied position, comprising a ratchet member rotatable with a rotary brake tightening element, and a cooperating pivoted locking dog, wherein the dog is actuated by a rotary trip element, which is operated by a manually controlled lever through a rotary gear driven element actuated by the lever to engage the dog with the ratchet member and disengaging the same therefrom by swinging movement of said lever in reverse directions.

A further object of the invention is to provide in a mechanism as set forth in the preceding paragraph positive stop means for limiting the pivotal movement of the dog when disengaged from the ratchet member.

Other objects of the invention will more clearly appear from the description and claims hereinafter following.

In the drawing forming a part of this specification, Figure 1 is a front elevational view of the upper portion of a gear driven, power multiplying hand brake mechanism, illustrating my improvements in connection therewith. Figure 2 is a vertical sectional view, corresponding substantially to the line 2—2 of Figure 1. Figure 3 is a view, similar to Figure 1, illustrating the parts in the position occupied when the dog is disengaged from the ratchet wheel of the brake mechanism. Figure 4 is a vertical sectional view, partly broken away, corresponding substantially to the line 4—4 of Figure 2.

In the drawing, my improvements are illustrated in connection with a well-known type of gear driven, power multiplying hand brake mechanism, in which the usual brake chain is wound on a brake drum, not shown, rotatable with a relatively large gear 10, driven by a pinion 11, fixed to a shaft 12, which is actuated in a well-known manner by the usual hand wheel, not shown. As is common practice, the operating parts of the hand brake mechanism are enclosed in a housing 13.

In carrying out my invention I provide broadly a ratchet wheel A rotatable with the pinion 11; a pivoted locking dog B cooperating with the ratchet wheel; a trip element C; an operating trip lever D; and a gear element E rotated by the lever D and meshing with teeth on the trip element C for actuating the latter.

The ratchet wheel A, locking dog B, the trip element C, and the gear E are contained within an upstanding chamber portion 14 of the housing 13.

The ratchet wheel A is of the usual type and is fixed to the shaft 12 which carries the pinion 11, and is rotated by the hand wheel, the ratchet wheel and pinion being preferably formed integral with said shaft.

The locking dog B, which cooperates with the ratchet wheel A is pivotally supported above said wheel on a pivot pin or short shaft 15, which extends through a cylindrical hub portion 16 at the upper end of the dog. The pivot pin 15 is arranged horizontally in parallelism with the axis of rotation of the ratchet wheel and has its opposite ends supported in suitable openings provided in the front and rear walls 17 and 18 of the upper part of the housing. The cylindrical hub portion 16 of the dog B is centrally cut out, as shown most clearly in Figure 2, thereby providing a fork structure presenting spaced arms 19—19 which accommodate the trip element C therebetween. As shown, the dog B has a depending tooth 20 which cooperates with the teeth of the ratchet wheel A. Adjacent the tooth 20, a relatively short, outstanding flange 21 is provided on the periphery of the hub portion 16, said flange extending toward the left, away from the tooth, as seen in Figure 4, and presenting an abutment shoulder 22 at its end which is substantially radial to the pivotal axis of said dog B.

The trip element C is in the form of a small gear member rotatably mounted on the pivot pin 15 of the dog B, between the arms 19—19 of the fork portion of said dog. The gearlike trip element C is provided with an interrupted set of teeth 23, extending about half way around said element, that is, through an arc of about 180 degrees. The teeth at opposite ends of said interrupted set 23 are indicated by 24 and 25. The teeth 24 and 25 form, in effect, shoulders adapted to engage respectively with the shoulder 22 of the dog, as shown in Figure 3, and the top portion of the side edge of the tooth 20 of the dog, as shown in Figures 1 and 4.

The operating lever D is swingingly supported at its lower end by a laterally extending, hollow, tubular, sleevelike shaft portion 26, journaled in suitable bearing members formed by openings in the front and rear walls 17 and 18 of the housing, and inwardly extending, cylindrical flanges surrounding said openings, thus providing bearing bosses 27 and 28 on said walls. As shown clearly in Figure 2, the portion of the shaft member 26 which is journaled in the boss 27 is of enlarged diameter, as indicated at 29, and the smaller diameter portion of said shaft, which is indicated by 30, carries the gear element E and has its end journaled in the boss 28. The gear element E is fixed to the shaft 26 for rotation in unison therewith by a key member 31 formed integral with said shaft. The gear E is accommodated between the inner ends of the bosses 27 and 28 and is confined against endwise movement with respect to the shaft member 26 by said bosses. The shaft 26 is locked against endwise removal by a retaining bolt 32 extending through the opening of said hollow shaft and having the head thereof shouldered against the outer side of the lever D. At the opposite end, the bolt 32 is provided with a nut which bears on a washer which is shouldered against the rear side of the rear wall 18 of the housing.

The gear element E is provided with an interrupted set of teeth 33 meshing with the teeth 23 of the trip element C to effect rotation of the latter when the gear E is rotated by to and fro swinging movement of the lever D. Pivotal swinging movement of the dog B away from the ratchet wheel A is positively limited by a stop lug 34, which is in the path of movement of the dog. The stop lug 34 is preferably in the form of an inward projection on the right hand side wall of the housing, as seen in Figures 1, 3, and 4, and is engaged by the upper portion of the side edge face of the tooth 20 of the dog B.

The operation of my improved hand brake mechanism is as follows: In applying the brakes, the ratchet wheel is rotated in clockwise direction, as viewed in Figures 1 and 4, the dog B ratcheting over the teeth of the same, being yieldingly held in engagement with the teeth by the action of gravity on the dog and the weight of the lever D which, at this time, is in the full line position shown at the left hand side of Figure 1. As will be evident, the lever D in its overbalanced position tends, through the gear E, to rotate the trip element C in clockwise direction and the latter, through engagement of the tooth 25 thereof with the tooth 20 of the dog, presses the same against the ratchet wheel. To release the brakes, the lever D is swung to the right, thus bringing the same to the dotted line position shown at the right of Figure 1. In this last named position, the tooth 24 of the trip element C engages the shoulder 22 of the dog B and upon relieving the pressure on the tooth of the dog by slightly tightening the brakes, that is, rotation of the ratchet wheel in clockwise direction, the weight of the lever D, in its overbalanced position, automatically disengages the dog from the ratchet wheel, as shown in Figure 3. The dog B may also be forcibly disengaged from the ratchet wheel by manually swinging the lever D to the position shown in Figure 3 without the slight tightening of the brakes. In this connection it is pointed out that swinging movement of the lever in direction to disengage the dog is positively limited by engagement of the tooth of the dog with the stop lug 34, through the connection provided by the intermeshing teeth of the gear E and the trip element C. To reengage the dog with the ratchet wheel, the lever D is swung from the position shown in Figure 3 to the left and to the full line position shown in Figure 1, thereby engaging the tooth 25 of the trip element C with the tooth 20 of the dog B, forcing the latter to swing downwardly into engagement with the teeth of the ratchet wheel. From the preceding description it will be evident that the motion transmitting means between the trip element C and the locking dog B is in the form of a lost motion connection, thus providing delayed action, and permitting swinging movement of the actuating lever D from one side to the other of a vertical plane extending through the axis of swinging movement of said lever.

I claim:

1. In a hand brake mechanism, the combination with a member adapted to be rotated to tighten the brakes; of a ratchet wheel rotatable with said member; a pivoted locking dog engageable with said ratchet wheel; a rotary gear element having shouldered engagement with said dog to move the same into and out of engagement with said ratchet wheel, said gear element having its axis of rotation coaxial with the pivotal axis of said dog; and a lever operated rotary gear member meshing with said gear element to impart rotation to the latter.

2. In a hand brake mechanism, the combination with a member adapted to be rotated to tighten the brakes; of a ratchet wheel rotatable with said member; a locking dog swingingly supported at one end on a pivot pin and having a tooth at the other end engageable with said ratchet wheel; a trip member rotatably supported on said pivot pin and having lost motion connection with said locking dog to actuate the latter to engage the same with and disengage the same from said ratchet wheel; a swinging operating lever; a rotary element oscillated by swinging movement of said lever in reverse directions; and intermeshing gear teeth on said element and trip member for transmitting rotary motion from the former to the latter.

3. In a hand brake mechanism, the combination with a member adapted to be rotated to tighten the brakes; of a ratchet wheel rotatable with said member; a locking dog swingingly supported at one end on a pivot pin and having a tooth at the other end engageable with said ratchet wheel; a trip member rotatably supported on said pivot pin and having circumferentially spaced shoulders engageable with said dog to swing said dog into and out of engagement with the ratchet wheel, said trip element having peripheral gear teeth; a rotary actuating gear member meshing with said teeth to rotate said trip element; and a reversely swingable operating lever connected to said gear member for rotating the latter.

4. In a hand brake mechanism, the combination with a member adapted to be rotated to tighten the brakes; of a ratchet wheel rotatable with said member; a pivot member rotatably supporting said dog for swinging movement toward and away from said ratchet wheel, said dog having a tooth engageable with said ratchet wheel; a rotary trip element provided with an interrupted set of peripheral teeth, said trip element being rotatably supported on said pivot member, the opposite end teeth of said set having shouldered engagement with said dog to swing the latter toward and away from said ratchet wheel; a rotary gear meshing with the teeth of said trip element to transmit rotary motion to the latter; and a swinging operating lever for rotating said gear.

5. In a hand brake mechanism, the combination with a member adapted to be rotated to tighten the brakes; of a ratchet wheel rotatable with said member; a swinging locking dog; a pivot shaft on which said dog is rotatably supported for swinging movement toward and away from said ratchet wheel; a projecting tooth on said dog engageable with said ratchet wheel; a peripheral shoulder on said dog circumferentially spaced from said tooth; a rotary trip element journaled on said pivot shaft; an interrupted set of gear teeth on said trip element, the teeth at opposite ends of said set having shouldered engagement respectively with said tooth and shoulder of said dog to move said dog toward and away from the ratchet wheel; a rotary shaft; an operating lever fixed to said shaft for rotating the same in reverse directions; and a gear fixed to said last named shaft for rotation therewith, said gear having teeth meshing with the teeth of said trip element to transmit rotary motion to the latter.

STACY B. HASELTINE.

REFERENCES CITED

The following references are of record in the file of this patent:

UNITED STATES PATENTS

| Number | Name | Date |
| --- | --- | --- |
| 2,158,055 | Burnett | May 16, 1939 |